United States Patent
Ramanathan et al.

(10) Patent No.: US 11,995,459 B2
(45) Date of Patent: May 28, 2024

(54) MEMORY COPY DURING VIRTUAL MACHINE MIGRATION IN A VIRTUALIZED COMPUTING SYSTEM

(71) Applicant: VMware, Inc., Palo Alto, CA (US)

(72) Inventors: Arunachalam Ramanathan, Union City, CA (US); Yanlei Zhao, Sunnyvale, CA (US); Anurekh Saxena, Newcastle, WA (US); Yury Baskakov, Newton, MA (US); Jeffrey W. Sheldon, Los Altos, CA (US); Gabriel Tarasuk-Levin, Mountain View, CA (US); David A. Dunn, Sammamish, WA (US); Sreekanth Setty, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 134 days.

(21) Appl. No.: 17/002,233

(22) Filed: Aug. 25, 2020

(65) Prior Publication Data

US 2022/0066806 A1    Mar. 3, 2022

(51) Int. Cl.
*G06F 9/455* (2018.01)
*G06F 9/50* (2006.01)
*G06F 12/1027* (2016.01)

(52) U.S. Cl.
CPC ........ *G06F 9/45558* (2013.01); *G06F 9/5077* (2013.01); *G06F 12/1027* (2013.01); *G06F 2009/4557* (2013.01); *G06F 2009/45583* (2013.01); *G06F 2212/152* (2013.01)

(58) Field of Classification Search
CPC ............... G06F 9/45558; G06F 9/5077; G06F 12/1027; G06F 2009/4557; G06F 2009/45583; G06F 2212/152
See application file for complete search history.

(56) References Cited

U.S. PATENT DOCUMENTS

| 7,680,919 B2 | 3/2010 | Nelson |
| 10,592,271 B1 * | 3/2020 | Sicron ................. G06F 9/45558 |
| 2005/0114607 A1 * | 5/2005 | Cohen ................... G06F 12/145 |
| | | 711/135 |

(Continued)

OTHER PUBLICATIONS

Setty, S. "VMware vSphere® vMotion® Architecture, Performance and Best Practices in VMware vSphere® 5—Performance Study," Technical White Paper, VMware, Inc., 2011, 26 pages.

*Primary Examiner* — Jacob D Dascomb
(74) *Attorney, Agent, or Firm* — Kim & Stewart LLP (57) ABSTRACT

A virtual machine (VM) is migrated from a source host to a destination host in a virtualized computing system, the VM having a plurality of virtual central processing units (CPUs). The method includes copying, by VM migration software executing in the source host and the destination host, memory of the VM from the source host to the destination host by installing, at the source host, write traces spanning all of the memory and then copying the memory from the source host to the destination host over a plurality of iterations; and performing switch-over, by the VM migration software, to quiesce the VM in the source host and resume the VM in the destination host. The VM migration software installs write traces using less than all of the virtual CPUs, and using trace granularity larger than a smallest page granularity.

20 Claims, 9 Drawing Sheets

(56) References Cited

U.S. PATENT DOCUMENTS

| | | | |
|---|---|---|---|
| 2014/0143771 A1* | 5/2014 | Tsirkin | G06F 9/45558 |
| | | | 718/1 |
| 2014/0164723 A1* | 6/2014 | Garthwaite | G06F 12/16 |
| | | | 711/162 |
| 2017/0357592 A1* | 12/2017 | Tarasuk-Levin | G06F 12/1009 |
| 2019/0034340 A1* | 1/2019 | Doshi | G06F 13/1668 |
| 2019/0034346 A1* | 1/2019 | Lv | G06F 12/0888 |
| 2021/0232511 A1* | 7/2021 | Boettcher | G06F 12/1009 |

* cited by examiner

MEMORY COPY DURING VIRTUAL MACHINE MIGRATION IN A VIRTUALIZED COMPUTING SYSTEM

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," incudes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Virtualized computing systems can have multiple hosts managed by a virtualization management server. The virtualization management server can facilitate migration of a VM from one host to another host. A goal of such a migration is to move the VM from source host to destination host with minimal impact on VM performance. In particular, the migration process includes some operations performed on the VM prior to "switch-over," where the VM is quiesced on the source host and started on the destination host. The VM continues executing on the source host during the pre-switch-over operations. Such pre-switch-over operations include copying the state of VM memory from source host to destination host. The memory copy phase can cause a significant drop in performance of the executing VM prior to switch-over, particularly in large VMs (e.g., hundreds of virtual CPUs and terabytes of memory).

SUMMARY

One or more embodiments provide a method of migrating a virtual machine (VM) from a source host to a destination host in a virtualized computing system, the VM having a plurality of virtual central processing units (CPUs). The method includes copying, by VM migration software executing in the source host and the destination host, memory of the VM from the source host to the destination host by installing, at the source host, write traces spanning all of the memory and then copying the memory from the source host to the destination host over a plurality of iterations; and performing switch-over, by the VM migration software, to quiesce the VM in the source host and resume the VM in the destination host; wherein the step of installing the write traces is executed by the VM migration software using less than all of the plurality of virtual CPUs.

Further embodiments include a non-transitory computer-readable storage medium comprising instructions that cause a computer system to carry out the above method, as well as a computer system configured to carry out the above method. Though certain aspects are described with respect to VMs, they may be similarly applicable to other suitable physical and/or virtual computing instances.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for memory copy during virtual machine (VM) migration in a virtualized computing system are described. VM migration involves migrating a running VM in a first host to a second host with minimal impact on the guest software executing in the VM. Each host is virtualized with a hypervisor managing VMs. The hypervisor allocates a portion of the system memory to each VM ("VM memory"). The hypervisor logically formats the VM memory into VM memory pages and maintains page tables that map the VM memory pages to machine addresses in the system memory. The VM migration process includes copying the VM memory pages from the first host to the second host and then executing a switch-over to cease execution of the VM on the first host and resume execution of the VM on the second host. To copy the VM memory pages, the VM migration module installs write traces on memory pages to track modifications of VM memory pages by the guest software during the copy process. The VM migration software executes the copy process over several iterations by first sending an entire copy of the VM memory to the destination host, then VM memory pages that were dirtied by the guest during the first iteration, followed by additional VM memory pages that were dirtied by the guest during the second iteration, and so on until converging on a threshold set of dirty VM memory pages that can be sent from source to destination during the switch-over phase.

One technique for write trace installation involves the hypervisor using all virtual central processing units (CPUs) assigned to the VM during installation of write traces. This technique of trace installation is referred to as "stop-based" trace installation, since no virtual CPUs are available for use by the guest software. After the traces are installed, all virtual CPUs flush their translation lookaside buffers (TLBs) before executing the guest software. Stop-based trace installation is a synchronous process and leaves no virtual CPUs to execute the guest code until write trace installation is complete. Such a technique can cause a noticeable drop in guest performance having an impact generally proportional to the size of the VM memory. According to certain embodiments, techniques for installing write traces include "loose trace" installation, where the VM migration software in the hypervisor uses less than all of the virtual CPUs assigned to the VM for the purpose of installing write traces and leaves some virtual CPUs to execute guest software. Thus, the guest software continues to execute on one or more virtual CPUs in parallel to the write trace installation process. In certain embodiments, the VM migration software uses only a single virtual CPU of the VM to install write traces. After trace installation, the VM migration software asks the virtual CPUs to lazily flush their TLBs. With lazy TLB flushing, the virtual CPUs flush their TLBs at the first opportunity, rather than immediately interrupting the current execution context. Loose trace installation handles races between trace installation and tracing firing, as discussed in embodiments below. The loose trace installation process has significantly less impact on the guest software during VM migration. Further, in some embodiments, the hypervisor installs write traces on memory pages having a larger granularity than the VM memory pages (referred to as "large page tracing"). Large page tracing further reduces the impact on guest software during VM migration. These and further aspects are discussed below with respect to the drawings.

Figure 1:
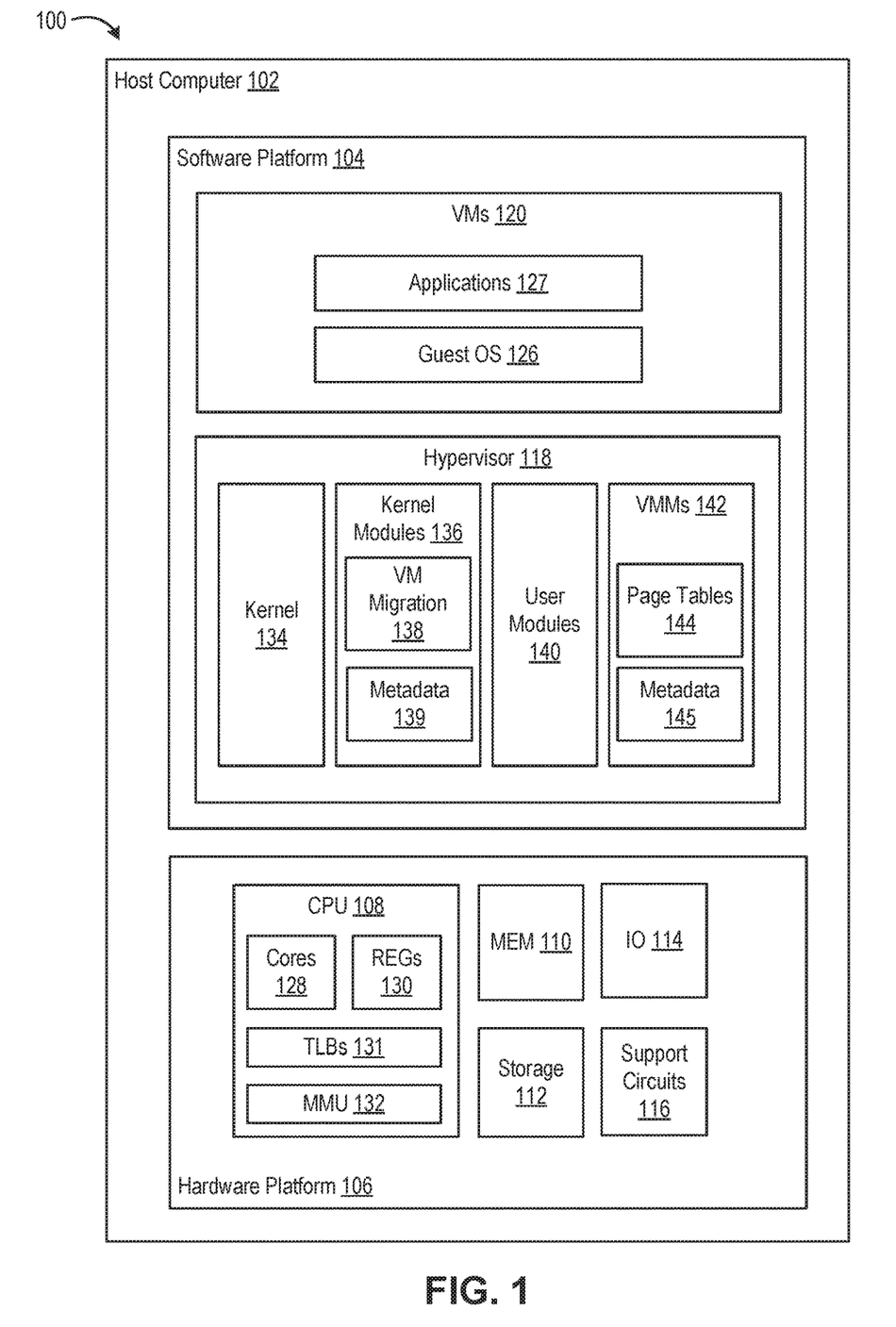
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such as a central processing unit (CPU) 108, system memory (MEM) 110, a storage system (storage) 112, input/output devices (IO) 114, and various support circuits 116. CPU 108 is configured to execute instructions, for example, executable instructions that perform one or more operations described herein and may be stored in system memory 110 and storage system 112. System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Storage 112 in multiple hosts 102 ran be aggregated and provisioned as part of shared storage accessible through a physical network (not shown). Input/output devices 114 include conventional interfaces known in the art, such as one or more network interfaces. Support circuits 116 include conventional cache, power supplies, clock circuits, data registers, and the like.

CPU 108 includes one or more cores 128, various registers 130, and a memory management unit (MMU) 132. Each core 128 is a microprocessor, such as an x86 microprocessor. Registers 130 include program execution registers for use by code executing on cores 128 and system registers for use by code to configure CPU 108. Code is executed on CPU 108 at a privilege level selected from a set of privilege levels. For example, x86 microprocessors from Intel Corporation include four privilege levels ranging from level 0 (most privileged) to level 3 (least privileged). Privilege level 3 is referred to herein as "a user privilege level" and privilege levels 0, 1, and 2 are referred to herein as "supervisor privilege levels." Code executing at the user privilege level is referred to as user-mode code. Code executing at a supervisor privilege level is referred to as supervisor-mode code or kernel-mode code. Other CPUs can include a different number of privilege levels and a different numbering scheme. In CPU 108, at least one register 130 stores a current privilege level (CPL) of code executing thereon.

MMU 132 supports paging of system memory 110. Paging provides a "virtual memory" environment where a virtual address space is divided into pages, which are either stored in system memory 110 or in storage 112. "Pages" are individually addressable units of memory. Each page (also referred to herein as a "memory page") includes a plurality of separately addressable data words, each of which in turn includes one or more bytes. Pages are identified by addresses referred to as "page numbers." CPU 108 can support multiple page sizes. For example, modern x86 CPUs can support 4 kilobyte (KB), 2 megabyte (MB), and 1 gigabyte (GB) page sizes. Other CPUs may support other page sizes.

MMU 132 translates virtual addresses in the virtual address space (also referred to as virtual page numbers) into physical addresses of system memory 110 (also referred to as machine page numbers). MMU 132 also determines access rights for each address translation. An executive (e.g., operating system, hypervisor, etc.) exposes page tables to CPU 108 for use by MMU 132 to perform address translations. Page tables can be exposed to CPU 108 by writing pointer(s) to control registers and/or control structures accessible by MMU 132. Page tables can include different types of paging structures depending on the number of levels in the hierarchy. A paging structure includes entries, each of which specifies an access policy and a reference to another paging structure or to a memory page. Translation lookaside buffer (TLB) 131 to caches address translations for MMU 132. MMU 132 obtains translations from TLB 131 if valid and present. Otherwise, MMU 132 "walks" page tables to obtain address translations. CPU 108 can include an instance of MMU 132 and TLB 131 for each core 128.

CPU 108 can include hardware-assisted virtualization features, such as support for hardware virtualization of MMU 132. For example, modern x86 processors commercially available from Intel Corporation include support for MMU virtualization using extended page tables (EPTs). Likewise, modern x86 processors from Advanced Micro Devices, Inc. include support for MMU virtualization using Rapid Virtualization Indexing (RVI). Other processor platforms may support similar MMU virtualization. In general, CPU 108 can implement hardware MMU virtualization using nested page tables (NPTs). In a virtualized computing system, a guest OS in a VM maintains page tables (referred to as guest page tables) for translating virtual addresses to physical addresses for a VM memory provided by the hypervisor (referred to as guest physical addresses). The hypervisor maintains NPTs that translate guest physical addresses to physical addresses for system memory 110 (referred to as machine addresses). Each of the guest OS and the hypervisor exposes the guest paging structures and the NPTs, respectively, to the CPU 108. MMU 132 translates virtual addresses to machine addresses by walking the guest page structures to obtain guest physical addresses, which are used to walk the NPTs to obtain machine addresses.

Software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes a hypervisor 118 that supports VMs 120. One example of hypervisor 118 that may be used in an embodiment described herein is a VMware ESXi™ hypervisor provided as part of the VMware vSphere® solution made commercially available from VMware, Inc. of Palo Alto, California (although it should be recognized that any other virtualization technologies, including Xen® and Microsoft Hyper-V® virtualization technologies may be utilized consistent with the teachings herein). Hypervisor 118 includes a kernel 134, kernel modules 136, user modules 140, and virtual machine monitors (VMMs) 142.

Each VM 120 includes guest software (also referred to as guest code) that runs on the virtualized resources supported by hardware platform 106. In the example shown, the guest software of VM 120 includes a guest OS 126 and client applications 127. Guest OS 126 can be any commodity operating system known in the art (e.g., Linux®, Windows®, etc.). Client applications 127 can be any applications executing on guest OS 126 within VM 120.

Kernel 134 provides operating system functionality (e.g., process creation and control, file system, process threads, etc.), as well as CPU scheduling and memory scheduling across guest software in VMs 120, VMMs 142, kernel modules 136, and user modules 140. VMMs 142 implement the virtual system support needed to coordinate operations between hypervisor 118 and VMs 120. Each VMM 142 manages a corresponding virtual hardware platform that includes emulated hardware, such as virtual CPUs (vCPUs) and guest physical memory (also referred to as VM memory). Each virtual hardware platform supports the installation of guest software in a corresponding VM 120. Each VMM 142 further maintains page tables (e.g., NPTs) on behalf of its VM(s), which are exposed to CPU 108. User modules 140 comprise processes executing in user-mode within hypervisor 118. Kernel modules 136 comprise processes executing in kernel-mode within hypervisor 118. In an embodiment, kernel modules 136 include a VM migration module 138. VM migration module is configured to manage migration of VMs from host computer 102 to another host computer or from another host computer to host computer 102.

Figure 2:
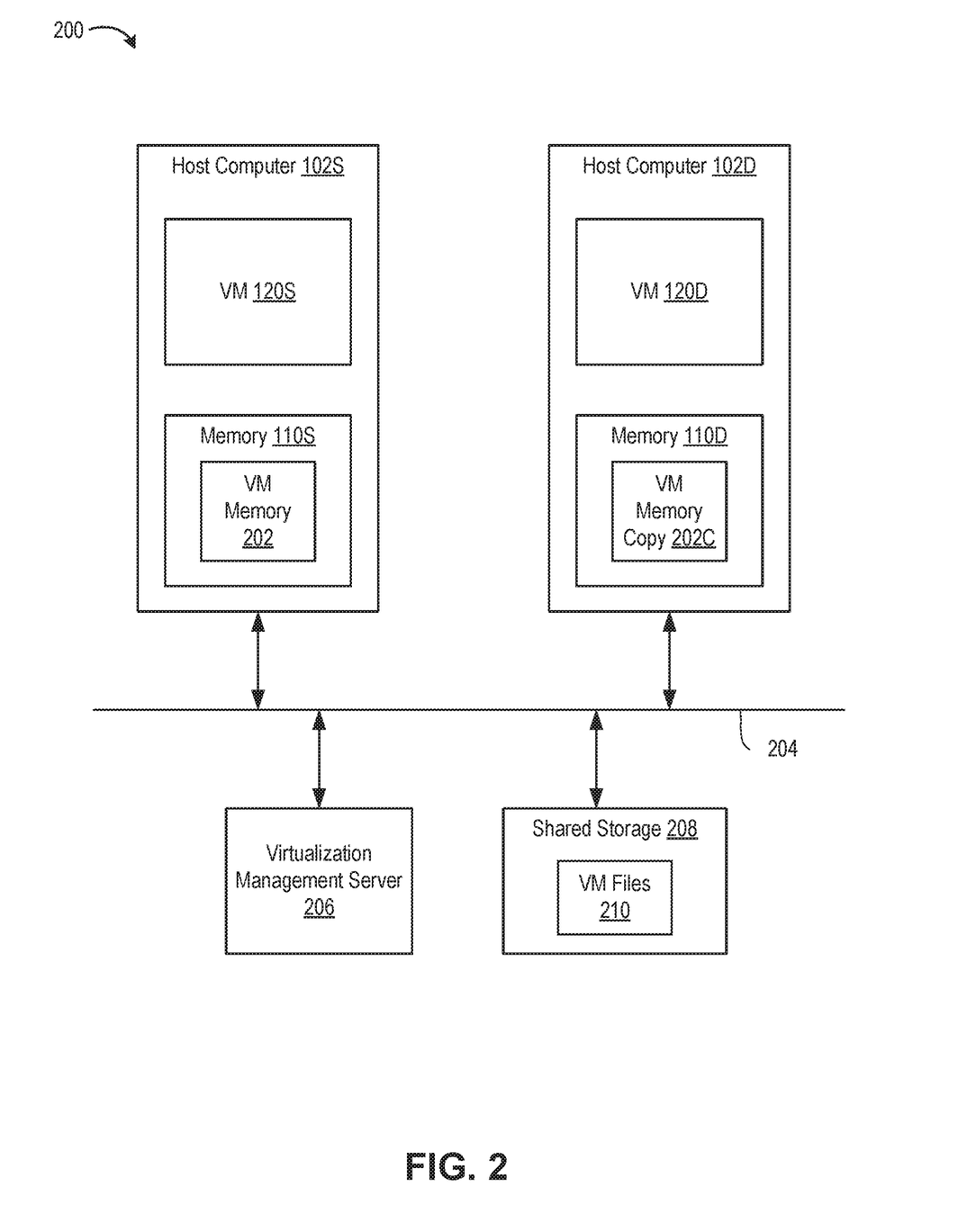
FIG. 2 is a block diagram depicting a virtualized computing system according to another embodiment.

FIG. 2 is a block diagram depicting a virtualized computing system 200 according to an embodiment. Virtualized computing system 200 includes two host computers 102S and 102D. Host computer 102S includes a VM 120S and memory 110S. VM 120S manages a portion of memory 110S referred to as VM memory 202. Host computers 102S and 102D are connected by a network 204. Virtualized computing system 200 can further include a virtualization management server 206 and shared storage 208. Virtualization management server 206 can manage host computers 102S and 102D (among other hosts) as a host cluster. In an embodiment, virtualization management server 206 facilitates migration of VM 120S from host computer to 102S to host computer 102D. After such migration, host computer 102D includes a VM 120D. VM 120D manages a portion of memory 110D in host computer 102D referred to as VM memory copy 202C. VM memory copy 202C is a copy of VM memory 202 in host computer 102S. Shared storage 208 can include VM files 210 for VM 120S (e.g., guest operating system files, client application files, etc.). Each host computer 102S and 102D can access shared storage 208 and hence VM files 210 to support VM 120S and VM 120D. Although the example of FIG. 2 includes VM files in shared storage 208, the techniques described herein can be employed in other types of VM migration that does not use such shared storage (e.g., migration where each host access VM files 210 on separate storage systems).

Figure 3:
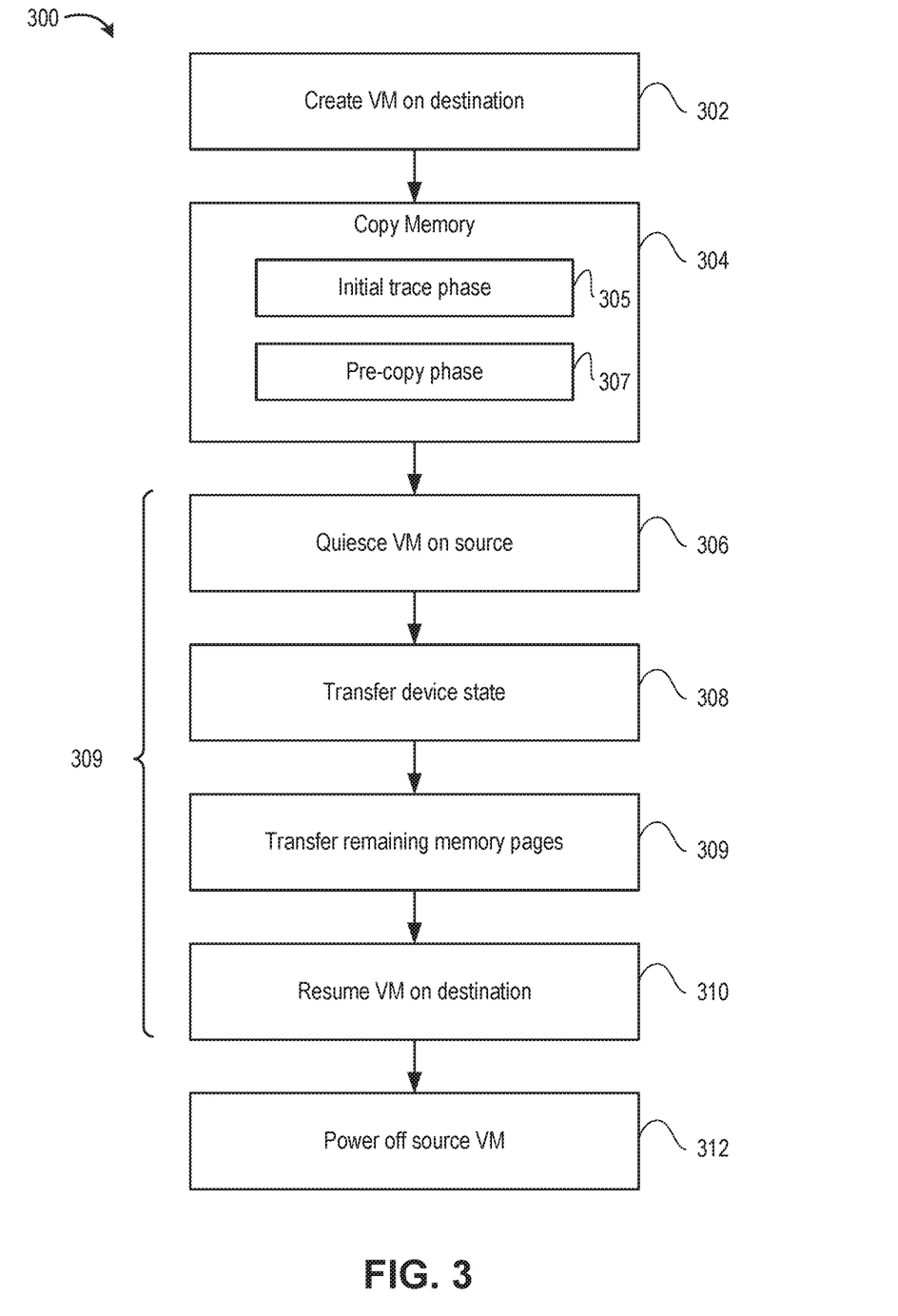
FIG. 3 is a flow diagram depicting a method of migrating a VM from a source host to a destination host according to an embodiment.

FIG. 3 is a flow diagram depicting a method 300 of migrating a VM from a source host to a destination host according to an embodiment. Method 300 can be performed through cooperation of VM migration modules 138 in host computer 102S and host computer 102D (referred to generally as VM migration software). Method 300 begins at step 302, where the VM migration software creates a VM on the destination host (e.g., VM 120D on host computer 102D). At this point in the process, VM 120D is not started. At step 304, the VM migration software copies the VM memory from the source host to the destination host. In the example of FIG. 2, the VM migration software copies VM memory 202 from host computer 102S to host computer 102D to establish VM memory copy 202C. The process of copying the VM memory is an iterative process described further below. At step 306, the VM migration software quiesces the VM on the source host (e.g., the VM 120S). At step 308, the VM migration software transfers device state for the VM from the source host to the destination host. The device state includes the state of any virtual devices used by the VM. At step 309, the VM migration software transfers a final set of VM memory pages from the source host to the destination host. At step 310, the VM migration software resumes the VM on the destination host. For example, the VM migration software resumes (e.g., starts) VM 120D on host computer 102D. Steps 306, 308, 309, and 310 of method 300 are referred to as "switch-over" during the migration process. At step 312, the VM migration software powers off the VM in the source host. For example, the VM migration software powers off VM 120S in host computer 102S.

In an embodiment, step 304 includes two phases. At step 305, the VM migration software performs an initial trace phase. During the initial trace phase, the VM migration software installs write traces on memory pages encompassing the entire VM memory to track any modifications during the copying of the VM memory to the destination. At step 307, the VM migration software performs the pre-copy phase. During the pre-copy phase, the VM migration software copies the VM memory from the source host to the destination host in an iterative process. The first iteration copies all the VM memory pages from source to destination. Subsequent iterations each copy only the VM memory pages that were modified during the previous iteration (dirty VM memory pages). Write traces are re-installed in response to the dirty VM memory pages in each iteration. After reaching a threshold, VM migration software ends the pre-copy phase and initiates the switch-over phase 309. During switch-over, the VM migration software transfers the last set of VM memory pages, restores device states, and initiates VM resume on the destination. The VMM in the destination host then restores virtual CPU states and the guest software continues execution.

During the pre-copy phase, the guest software in the VM continues executing and can modify VM memory pages that have already been copied to the destination host. Thus, the VM migration software tracks dirty VM memory pages using write tracing. VM migration module 138 requests VMM 142 to install write traces on VM memory pages. VMM 142 can install write traces on VM memory pages using various techniques, which are described below. As such, when the guest software attempts to write to a VM memory page having a write trace, the VMM is notified (referred to as a "trace fire"). VMM 142 maintains metadata 145 (FIG. 1) that tracks the presence of write traces on the VM memory pages and dictates what to do when traces are fired. In embodiments, VMM 142 handles the trace fires by notifying VM migration module 138 of which VM memory pages the guest has modified. VM migration module 138 maintains metadata 139 (FIG. 1), which keeps track of dirtied VM memory pages that need to be transferred to the destination. During the initial trace phase (305), VM migration module 138 in the source host requests write traces on all VM memory pages. During the pre-copy phase (307), VM migration module 138 in the source host requests write traces on only those VM memory pages that were modified by the guest software during a given iteration of the pre-copy phase (as identified by metadata 139).

Write trace installation includes two parts: the first part involves write trace enforcement and the second part involves tracking the presence of a write trace on a memory page and dictating what action to take if a write trace is fired. The VMM can enforce write traces using various techniques described herein. In an embodiment, VMM 142 enforces write traces by setting read-only flags in PTEs referencing memory pages to be traced. In another embodiment, VMM 142 enforces write traces by having not present (missing) mappings in the corresponding PTEs. Not present mapping can be achieved by dropping a mapping in a PTE if there was one. This will force a page fault if the guest attempts to access the memory page. In another embodiment, VMM 142 enforces write traces using dirty flags of the PTEs or using a hardware mechanism in the CPU that records modified memory pages in a buffer (e.g., Intel's page modification logging (PML) mechanism in some x86 processors). Effectively, VMM 142 can enforce a write trace using software or hardware mechanisms. Software mechanism include setting the read-only flags or setting not present mappings in the PTEs. Hardware mechanisms include features of the processor that record modified memory pages (e.g., PML). VMM 142 can use any of the aforementioned trace enforcement techniques in the various embodiments of VM migration described herein.

Figure 4A:
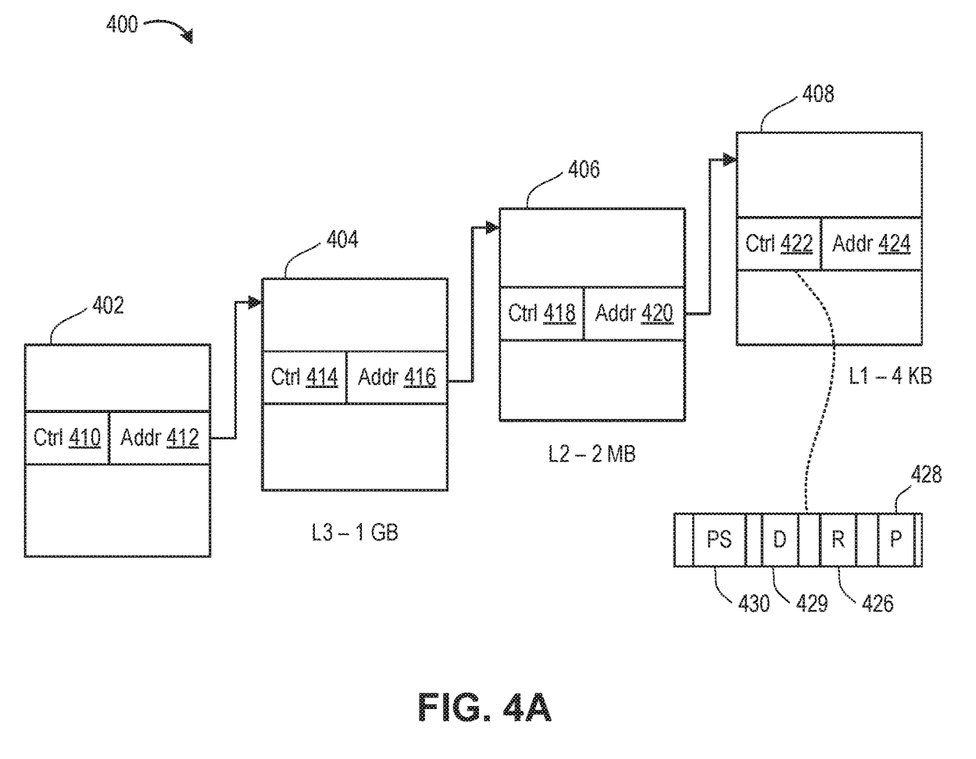
FIG. 4A depicts a page table hierarchy according to an embodiment.

FIG. 4A depicts a page table hierarchy 400 according to an embodiment. In the example, page table hierarchy 400 is a four-level hierarchy such as can be configured for use by an x86 processor. Page table hierarchy 400 includes a base table 402. Page table entries (PTEs) in table 402 include control (ctrl) bits 410 and address (addr) bits 412. In each PTE, address bits 412 contain an address of a table 404 in the next level (referred to as level 3 or L3). Thus, L3 includes a number of tables 404 corresponding to the number of PTEs in table 402 (e.g., 512 tables 404). Each PTE in table 404 includes control bits 414 and address bits 416. In each PTE, address bits 416 contain an address of a table 406 in the next level (referred to as level 2 or L2). Thus, L2 includes a number of tables 406 corresponding to the product of the number of PTEs in table 402 and table 404 (e.g., 512×512=262,144 tables 406). Each PTE in table 406 includes control bits 418 and address bits 420. In each PTE, address bits 420 contain an address of a table 408 in the final level (referred to as level 1 or L1). Thus, L1 includes a number of tables 408 corresponding to the product of the number of PTEs in tables 402, table 404, and table 406 (e.g., $512^3$ tables 408). Each PTE in table 408 includes control bits 422 and address bits 414. Address bits 424 contain an address of a memory page. Control bits 422 include several flags, including a read-only flag 426, a present flag 428, a dirty flag 429, and page size (PS) flag 430. If read-only flag 426 is set, a translation reaching that PTE generates a page fault exception. Likewise, if present flag 428 indicates the mapping is not present, a translation reaching that PTE generates a page fault exception. MMU 132 sets the dirty flag 429 when the translation was caused by a write instruction. PS flag 430 indicates whether a PTE maps to a page or another page table. CPU 108 can support a plurality of different page sizes for address translation (also referred to as page granularities). While the example only shows flags for PTEs in table 408 by way of example, PTEs in tables 404 and 406 likewise include the same or similar flags.

In the example of FIG. 4, each PTE in table 408 controls a 4 KB memory region (i.e., a VM memory page). Thus, in this example, the VM memory pages have granularity of 4 KB, the smallest granularity represented in the page tables. PTEs in tables 408 have their PS 430 set and PTEs in tables 404 and 406 have their PS 430 unset. Each PTE in table 406 controls a 2 MB memory region. Each PTE in table 404 controls a 1 GB memory region. PTEs at L2 and L3 effectively map to memory regions of larger granularity, e.g., 2 MB and 1 GB, respectively, in this example. A 2 MB large memory region encompasses 512 VM memory pages. A 1 GB large memory region encompasses $512^2=262,144$ VM memory pages. Note that CPUs can support larger than four-level hierarchies and different page sizes at each level. Further, the page size used in page tables 400 can be other than the smallest granularity (e.g., 2 MB or 1 GB paging).

Figure 4B:
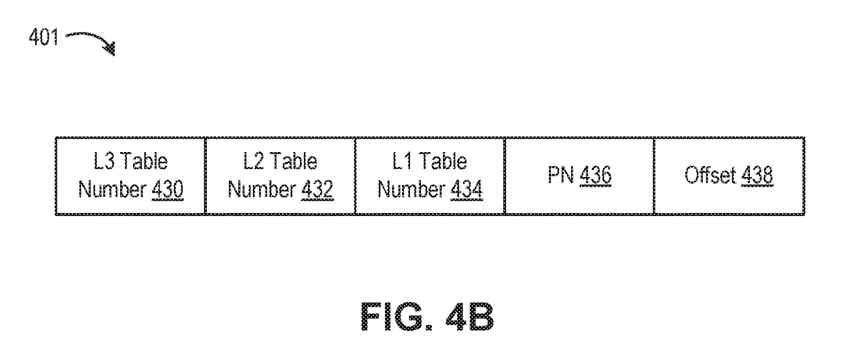
FIG. 4B is a block diagram depicting an address according to an example.

FIG. 4B is a block diagram depicting an address 401 according to an example. Address 401 is formatted for a four-level page table hierarchy as shown in the example of FIG. 4A. Address 401 includes an L3 table number 430, which selects a PTE in table 402 that points to one of the L3 tables 404. Address 401 includes an L2 table number 432, which selects a PTE in table 404 that points to one of the L2 tables 406. Address 401 includes an L1 table number 434, which selects a PTE in table 406 that points to one of the L1 tables 408. Address 401 includes a page number (PN) 436, which selects a PTE in table 408 that points to one of the 4 KB memory pages. Address 401 includes an offset 438 into the selected 4 KB memory page. In the example, L1 table number 434 identifies a 2 MB region of memory (referred to as a 2 MB memory page). L2 table number 432 identifies a 1 GB region of memory (referred to as a 1 GB memory page).

VMM 142 maintains metadata 145 (FIG. 1) to track write traces. For example, if trace enforcement relies on page faults, VMM 142 uses metadata 145 to determine if a page fault is observed because of an installed write trace or for some other unrelated reason. VMM 142 also uses metadata 145 to determine an action to take in response to the fired trace. In embodiments, VMM 142 reacts to a fired trace (e.g., a page fault) by notifying the VM migration software of the page number for the modified memory page. An example of metadata 145 is described below.

One technique for installing write traces is to stop all virtual CPUs of the VM first and then distribute the work of installing write traces to each virtual CPU (referred to as "stop-based trace installation"). Write traces are installed on sets of memory pages referenced in the lowest-level page tables (e.g., 4 KB pages referenced in L1 page tables). Since all virtual CPUs are used to install write traces, the guest software is unresponsive during the trace install period. Stop-based trace installation can be interleaved with memory copying during VM migration. If the VM includes many virtual CPUs and/or a large amount of memory, the guest software can be unresponsive for undesirable amount of time. Furthermore, write traces are installed on the largest amount of memory pages. Finally, stop-based trace installation has the synchronization cost described above in addition to preventing the guest from running (e.g., synchronization between write trace installation and forced TLB flushing).

Figure 5:
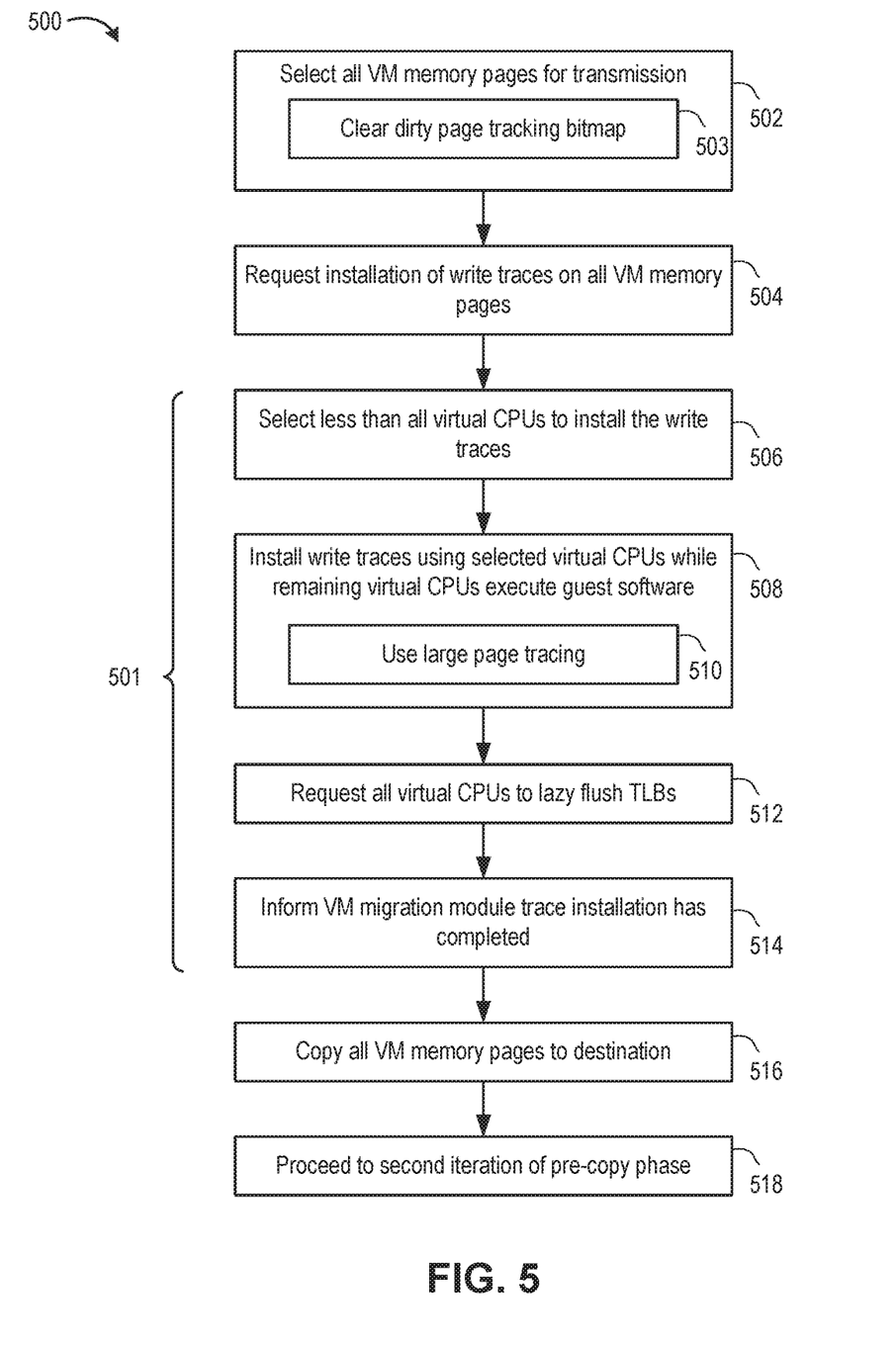
FIG. 5 is a flow diagram depicting a method of installing write traces according to an embodiment.

FIG. 5 is a flow diagram depicting a method 500 of executing the initial trace phase and a first iteration of the pre-copy phase according to an embodiment. Method 500 can be performed by VM migration module 138 in cooperation with VMM 142. Method 500 begins at step 502, where VM migration module 138 selects all VM memory pages for transmission to the destination. In embodiments, VM migration module 138 maintains a dirty page tracking bitmap (tracking bitmap) as metadata 139. The bitmap includes a bit for each VM memory page (e.g., each 4 KB page). When a bit is set, the specified page is dirty (i.e., has been modified by the guest). When the bit is clear, the specified page is unmodified since being traced. In embodiments, at step 503, VM migration module 138 clears the dirty page tracking bitmap after selecting all pages for transmission.

At step 504, VMM 142 receives a request from VM migration module 138 to install write traces on all VM memory pages. At step 506, VMM 142 selects less than all virtual CPUs for VM 120 to install write traces. In an embodiment, VMM 142 selects one virtual CPU to install write traces. Alternatively, VMM 142 can select multiple virtual CPUs to install write traces, but less than all virtual CPUs. Guest software continues to execute on those virtual CPUs not selected for trace installation at step 506. Thus, guest software executes in parallel to method 500. At step 508, VMM 142 installs write traces using selected virtual CPUs while the remaining virtual CPUs execute the guest software of VM 120. At step 512, VMM 142 requests all virtual CPUs to perform a lazy TLB flush. In an embodiment, the request to flush TLBs is a lazy request such that the virtual CPUs can perform the flush without interrupting the current execution context (e.g., during a context switch). Thus, the virtual CPUs are not required to immediately stop execution and flush their TLBs. At step 514, VMM 142 informs VM migration module 138 that the trace installation has completed. In an embodiment, the last virtual CPU to flush its TLB is charged with informing VM migration module 138 that the trace installation request has been completed. At step 516, VM migration module 138 copies all memory pages to the destination host. Step 516 is the first iteration of the pre-copy phase. At step 518, VM migration module 138 proceeds to the second iteration of the pre-copy phase.

Steps 506-514 are part of a trace installation process 501 executed by VMM 142. Trace installation process 501 is referred to herein as a "loose tracing." With stop-based tracing, the hypervisor uses all virtual CPUs during trace installation with the side-effect of disrupting the guest software. The cost of stopping all virtual CPUs is not constant. The more virtual CPUs stopped, the longer the disruption to the guest software. With loose tracing, less than all virtual CPUs are stopped and used for trace installation. Further, the virtual CPUs flush their TLBs lazily, as opposed to immediately on-demand as in stop-based tracing. In an embodiment, only a single virtual CPU is stopped, with the remaining virtual CPUs continuing to execute the guest software. Loose tracing exhibits significantly less disruption for the guest software as compared to stop-based tracing.

In an embodiment, during trace installation (step 508), VMM 142 installs write traces on large memory pages. This is referred to as "large page tracing." Thus, rather than install write traces on all VM memory pages (e.g., 4 KB pages), VMM 142 installs write traces on larger pages (e.g., 1 GB pages). Since large page tracing involves many less updates to the page tables and/or metadata, initial trace installation can be performed in one batch. If a large amount of write traces are to be installed (e.g., on the entire VM memory), installing write traces on all VM memory pages can lengthen trace installation time as compared to stop-based tracing (e.g., since less virtual CPUs are installing traces in loose tracing). Since there are many less large pages, large tracing is more efficient and reduces trace installation time. While large page tracing exhibits the benefits described above, the loose page tracing techniques described herein do not require large page tracing. If large tracing is not used, VMM 142 can install write traces on all VM memory pages (e.g., all 4 KB pages). Such an operation can be done in batches and interleaved with memory copying, as discussed below with respect to FIG. 6.

As used herein, in the context of installing write traces, "large page" is a memory chunk larger than the range spanned by a VM memory page (e.g., 4 KB). Large page in the context of write trace installation does not mean a mapping in the page tables to a large page for address translation. Large page tracing can be used regardless of the page size set in the page tables for purposes of address translation. The various examples herein assume that the page size set in the page tables for address translation is the smallest granularity (e.g., 4 KB). That is, each guest physical address is translated into a 4 KB machine page. However, address translation can use other page sizes. For example, each guest physical address can be translated into a larger granularity, such as a 2 MB machine page or a 1 GB machine page.

Returning to FIG. 3, in an embodiment, at step 305, the VM migration software uses loose tracing to install write traces for all VM memory pages. In an embodiment, the VM migration software uses loose tracing with large memory pages (e.g., 1 GB write traces).

With loose tracing discussed above, less than all virtual CPUs are stopped and used for trace installation, meaning that at least one virtual CPU executes guest instructions and potentially dirties pages. Thus, some traces can fire as traces are being installed. This race condition can be handled by selecting pages for transmission prior to installing traces (step 502) and then clearing the dirty page tracking bitmap (step 503). Further, the trace fire process can be reordered such that VMM 142 removes traces before informing VM migration module 138 of the trace fire. VMM 142 maintains the invariant that at any given time, a page is either traced or selected for transmission. The trace fire process is discussed further below.

Figure 6:
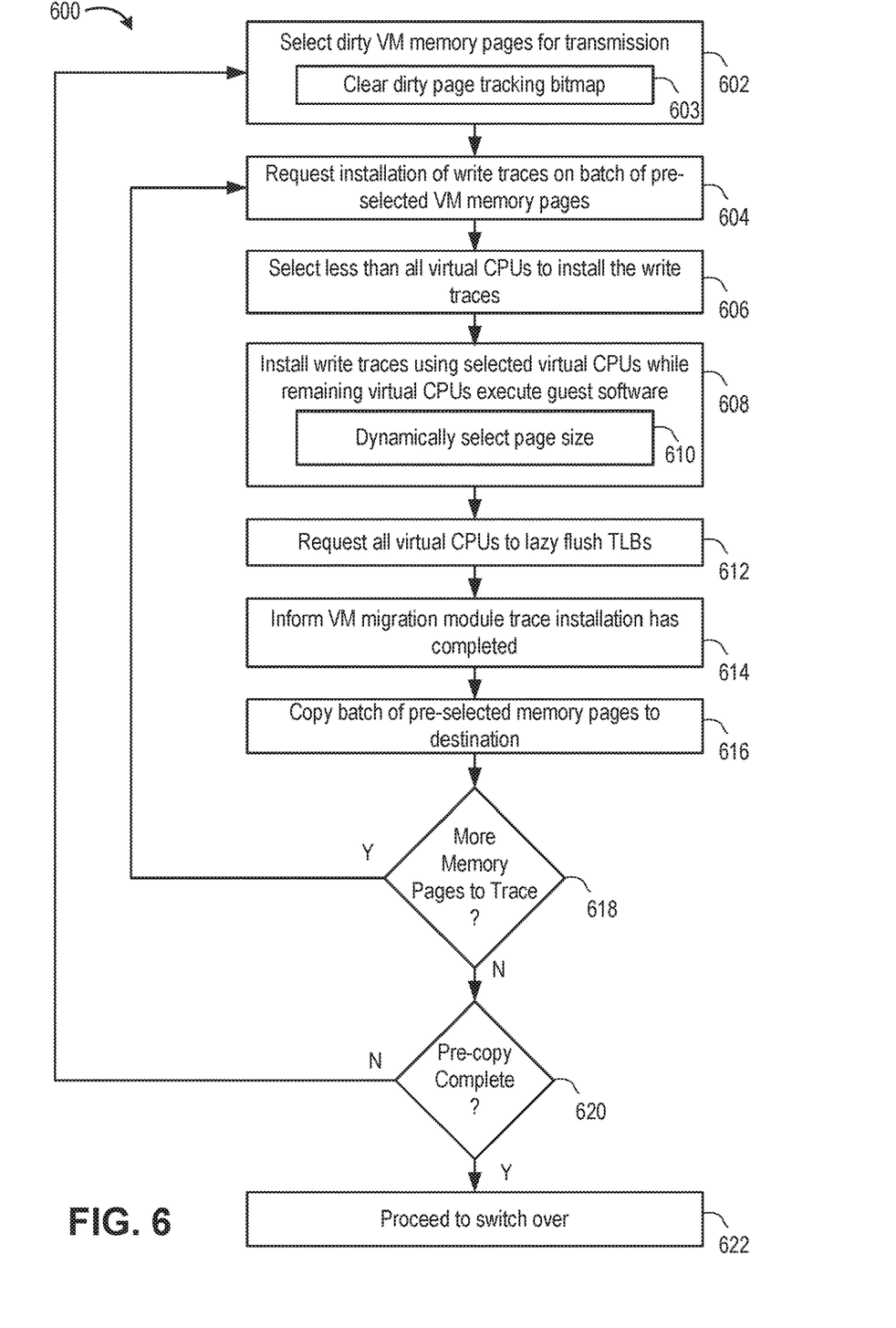
FIG. 6 is a flow diagram depicting execution of pre-copy phase iterations after all VM memory pages have been copied according to an embodiment.

FIG. 6 is a flow diagram depicting execution of pre-copy phase iterations according to an embodiment. Method 600 can be performed by VM migration module 138 in cooperation with VMM 142. Method 600 begins at step 602, where VM migration module 138 selects dirty VM memory pages for transmission to the destination. VM migration module 138 determines the dirty VM memory pages by processing metadata 139 (e.g., the dirty page tracking bitmap). At step 603, VM migration module 138 clears the dirty page tracking bitmap. At step 604, VM migration module 138 requests VMM 142 to install write traces on a batch of the pre-selected VM memory pages. In embodiments, VMM 142 installs write traces at the lowest granularity (e.g., 4 KB). Thus, the process or installing write traces is performed in batches and interleaved with memory copying. Depending on the number of pre-selected VM memory pages at step 602, VMM 142 performs trace installation over one or more batches.

At step 606, VMM 142 selects less than all virtual CPUs for VM 120 to install write traces. In an embodiment, VMM 142 selects one virtual CPU to install write traces. Alternatively, VMM 142 can select multiple virtual CPUs to install write traces, but less than all virtual CPUs. Guest software continues to execute on those virtual CPUs not selected for trace installation at step 606. Thus, guest software executes in parallel to method 600. At step 608, VMM 142 installs write traces using selected virtual CPUs while the remaining virtual CPUs execute the guest software of VM 120. At step 612, VMM 142 requests all virtual CPUs to perform a lazy TLB flush. At step 614, VMM 142 informs VM migration module 138 that the trace installation has completed. In an embodiment, the last virtual CPU to flush its TLB is charged with informing VM migration module 138 that the trace installation request has been completed. At step 616, VM migration module 138 copies a batch of the pre-selected memory pages to the destination host.

At step 618, VM migration module 138 determines whether there are more VM memory pages to be traced (i.e., whether there are additional batches). If so, method 600 returns to step 604 and repeats for another batch. Otherwise, method 600 proceeds to step 620. At step 620, VM migration module 138 determines whether the pre-copy phase is complete. If not, method 600 returns to step 602 for another iteration. Otherwise, method 600 proceeds to step 622, where VM migration module 138 proceeds to the switch-over phase.

During trace fires, VMM 142 uninstalls the write trace on each memory page to which the guest writes. The process for handing trace fires is discussed below. At the start of an iteration of the pre-copy phase, there can be any number of untraced memory pages that require new write traces. In embodiments, during the pre-copy phase, VMM 142 installs write traces at lowest page granularity (e.g., 4 KB pages). Alternatively, at the start of an iteration of the pre-copy phase, VMM 142 can select a larger page size for trace installation (e.g., 1 GB or 2 MB). In embodiments, at step 610, VMM 142 can dynamically select the page size for trace installation during pre-copy iterations during run-time (e.g., based on VM workload characteristics). At the beginning of each new iteration, VMM 142 can install large traces on all changed pages in one batch (since large tracing is fast) and then skip batched trace installation.

Figure 7:
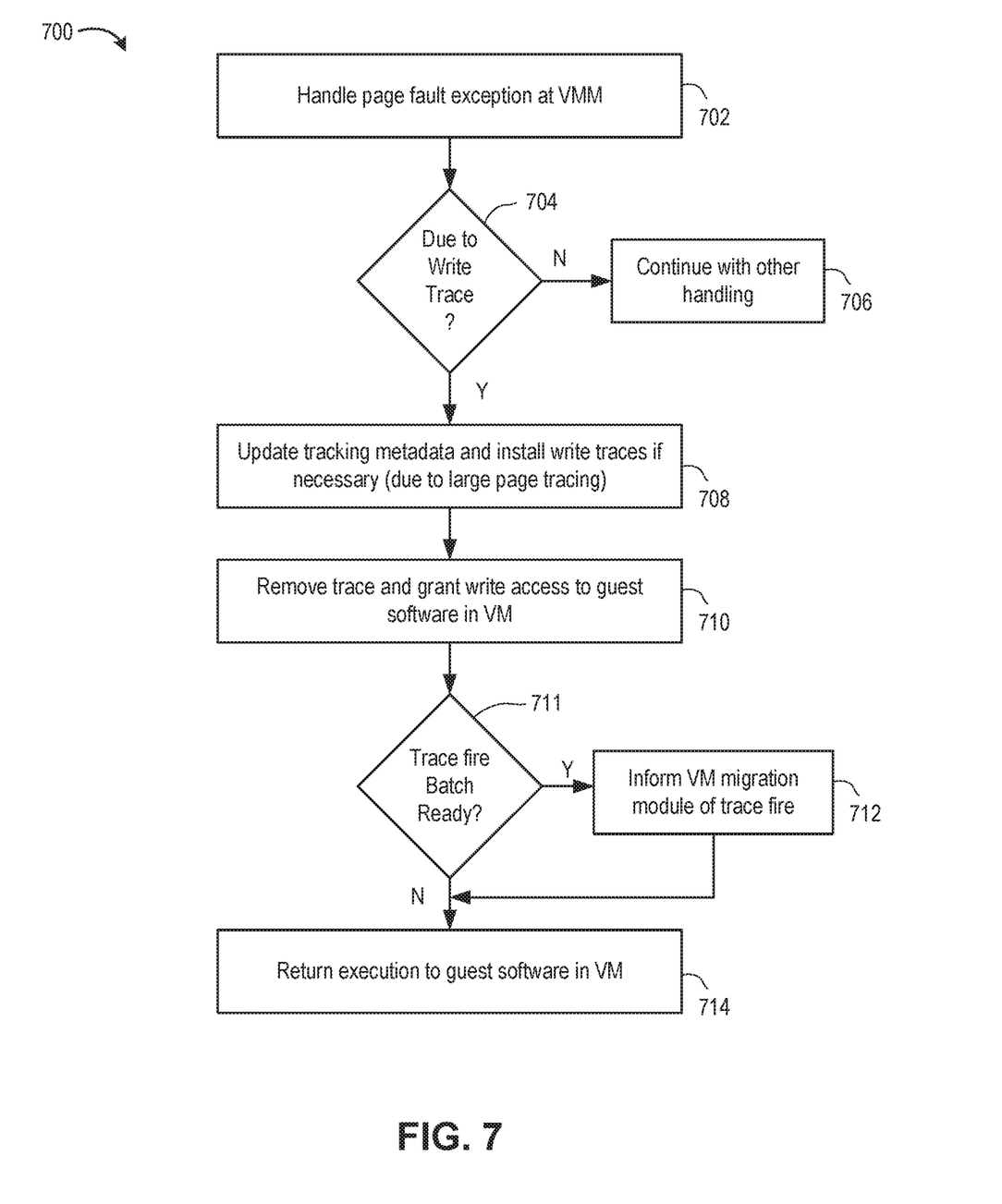
FIG. 7 is a flow diagram depicting a method of handling trace fires according to an embodiment.

FIG. 7 is a flow diagram depicting a method 700 of handling trace fires according to an embodiment. Method 700 begins at step 702, where VMM 142 handles a page fault exception generated by guest software. At step 704, VMM 142 determines if the page fault exception is due to an installed write trace. VMM 142 can analyze metadata 145 to determine if a trace is installed on a memory page referenced in the address being translated. If not, method 700 proceeds to step 706, where VMM 142 continues with normal handling of the page fault (not due to a write trace). Otherwise, method 700 proceeds to step 708. At step 708, VMM 142 updates metadata 145 based on the accessed memory page. The structure and updating of metadata 145 are discussed below. In case of large page tracing, VMM 142 may install some additional write traces based on the metadata update. At step 710, VMM 142 removes the trace (e.g., by resetting the read-only bit or adding a mapping) and grants write access to the guest software in the VM. At step 711, VMM 142 determines whether a batch of trace fires is ready to be notified to VM migration module 138. The batch can include one or more trace fires. For example, VMM 142 can wait to notify VM migration module 138 of trace fires after some threshold number of trace fires have occurred. If ready, at step 712, VMM 142 informs VM migration module 138 of the trace fire. If not ready, VMM 142 queues the trace fire notification in the batch. From either step 711 or step 712, method 700 proceeds to step 714, where VMM 142 returns execution to the guest software in the VM.

Figure 9:
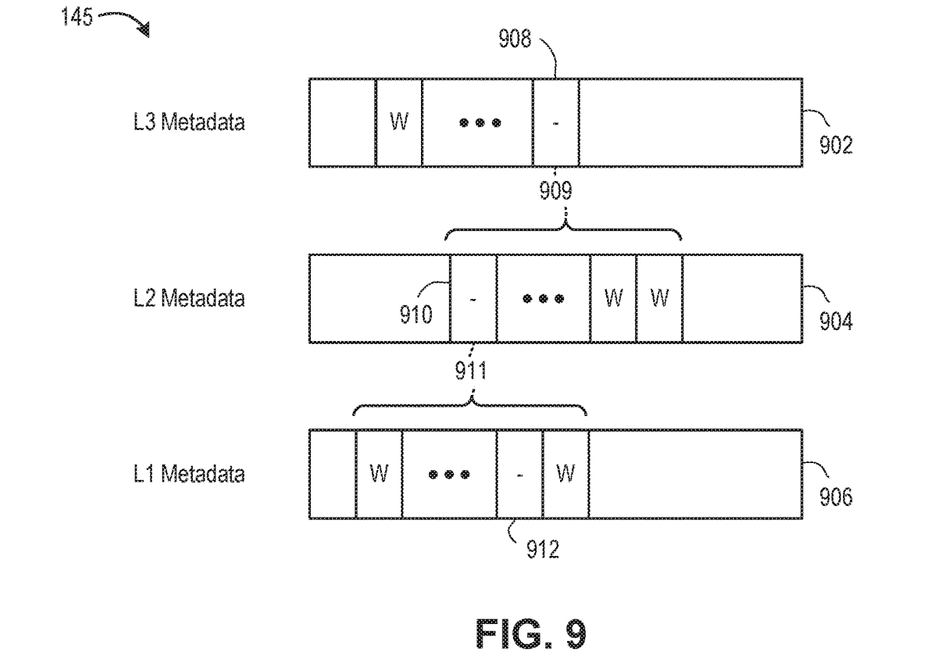
FIG. 9 is a block diagram depicting a structure of write trace tracking metadata according to an embodiment.
Figure 10:
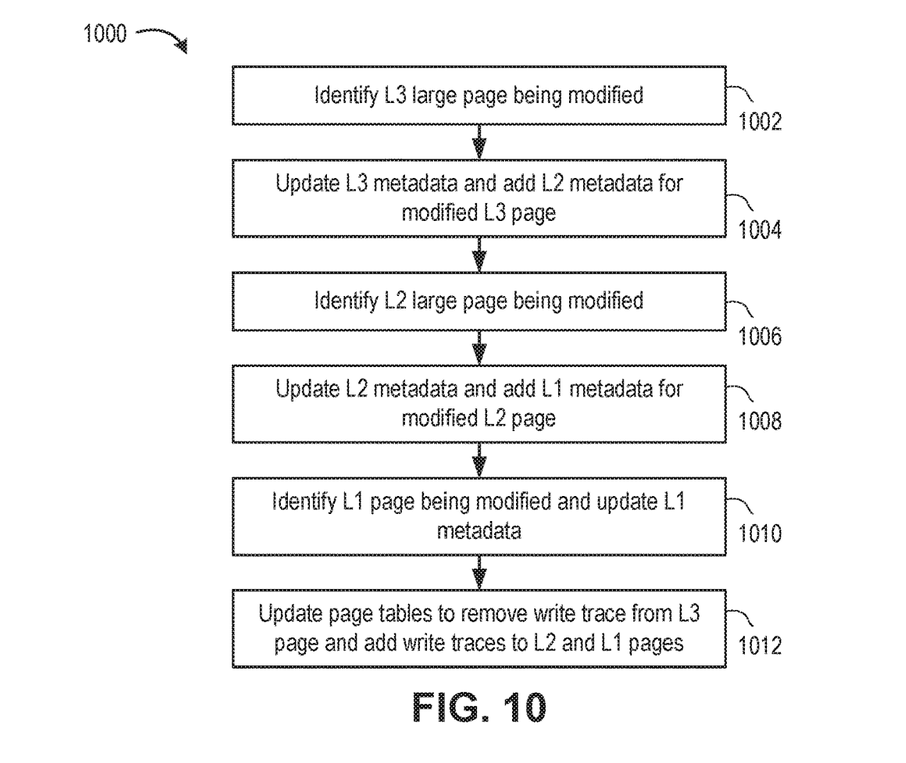
FIG. 10 is a flow diagram depicting a method of updating write traces in response to a trace fire according to an embodiment.

FIG. 9 is a block diagram depicting a structure of write trace tracking metadata 145 according to an embodiment. FIG. 10 is a flow diagram depicting a method 1000 of updating write traces in response to a trace fire according to an embodiment. Referring to FIG. 9, VMM 142 maintains metadata 145 that can include one or more tiers based on the granularity of the traces. In the example, metadata 145 includes three tiers of L3 metadata 902, L2 metadata 904, and L1 metadata 906 based on VMM 142 installing write traces on 1 GB large pages. Entries in L3 metadata 902 represent 1 GB large pages and indicate whether such pages are traced. Entries in L2 metadata 904 represent 2 MB large pages and indicate whether such pages are traced. Entries in L1 metadata 906 represent 4 KB pages and indicate whether such pages are traced. In the example, entries marked with "W" are traced and entries marked with "-" are untraced.

Referring to FIG. 10, method 1000 can be performed by VMM 142 in response to a trace fire. In the trace fire, VMM 142 handles a page fault having an address whose translation caused the page fault. For example, the guest attempts to write to a VM memory page encompassed by a 1 GB large page associated with entry 908 in L3 metadata 902. Method 1000 begins at step 1002, where VMM 142 identifies the L3 large page being modified. VMM 142 locates an entry in L3 metadata 902 associated with the 1 GB page number indicated by L2 table number 432 in the address (FIG. 4B).

At step 1004, VMM 142 updates L3 metadata 902 to mark the identified L3 large page as untraced and adds entries 909 in L2 metadata 904 for L2 large pages encompassed by the identified L3 large page. The added entries 909 to L2 metadata 904 are marked as traced. For example, VMM 142 adds 512 entries to L2 metadata 904 for the corresponding 512 2 MB large pages encompassed by the 1 GB large page being modified.

At step 1006, VMM 142 identifies the L2 large page being modified. VMM 142 locates an entry 910 in L2 metadata 904 associated with the 2 MB page number indicated by L1 table number 434 in the address (FIG. 4B). At step 1008, VMM 142 updates L2 metadata 904 to mark the identified L2 large page as untraced and adds entries 911 in L1 metadata 906 for L1 pages encompassed by the identified L2 large page. The added entries 911 to L1 metadata 906 are marked as traced. For example, VMM 142 adds 512 entries to L1 metadata 906 for the corresponding 512 4 KB pages encompassed by the 2 MB large page being modified.

At step 1010, VMM 142 identifies the L1 page (VM memory page) being modified. VMM 142 locates an entry 912 in L1 metadata 906 associated with the 4 KB page number indicated by PN 436 in the address (FIG. 4B). In addition, VMM 142 updates the L1 metadata 906 to mark the identified L1 page as untraced. At step 1012, VMM 142 updates the page tables to remove the write trace from the L3 large page being modified and adds write traces to the corresponding L2 and L1 pages to match metadata 145. That is, VMM 142 installs write traces for the 2 MB large pages corresponding to entries 909 other than entry 910. VMM 142 installs write traces for the 4 KB pages corresponding to entries 911 other than entry 912. VMM 142 removes the write trace from the 1 GB large page corresponding to entry 908. Removal of the write trace includes ensuring that a mapping exists in the page tables to the 4 KB page corresponding to the entry 912 (the VM memory page being modified by the guest) and that the guest can write to such VM memory page.

In the example of FIGS. 9 and 10, the trace is fired for modification of an L3 large page (e.g., 1 GB large page). Similar steps are performed if the trace is fired for modification of an L2 large page (e.g., 2 MB large page).

During switch-over, the VM migration software suspends the VM in the source host, takes a checkpoint of virtual device state, transmits the device state checkpoint and remaining dirtied pages after pre-copy to the destination host, restores the device state to the destination VM, and resumes the VM in the destination host. In addition to device state checkpoint and the remaining dirtied pages, the VM migration software can transfer metadata from the source to the destination. This metadata can include the bitmap used by VM migration module 138 and VMM 142 in the source host used to track the remaining dirtied pages. The reason for transmitting the changed bitmap to the destination is that the virtual device restore process is started on the destination host while memory pages are still remaining on the source host. So if a virtual device requires any of those memory pages during restore, then the destination VM needs to remote fault those pages from the source. Transferring the changed bitmap and marking those pages yet to be transferred as remote assists VM migration module 138 in the destination host achieve parallelism between virtual device checkpoint restore and transferring the remaining pages.

The changed bitmap size is in KBs for a VM with only a few GBs of memory. But for a VM with multiple terabytes of memory, the changed bitmap can be large (e.g., 768 MB for a VM having 24 TB of RAM). Taking the time to transfer such a large changed bitmap increases the switch-over time.

Figure 8:
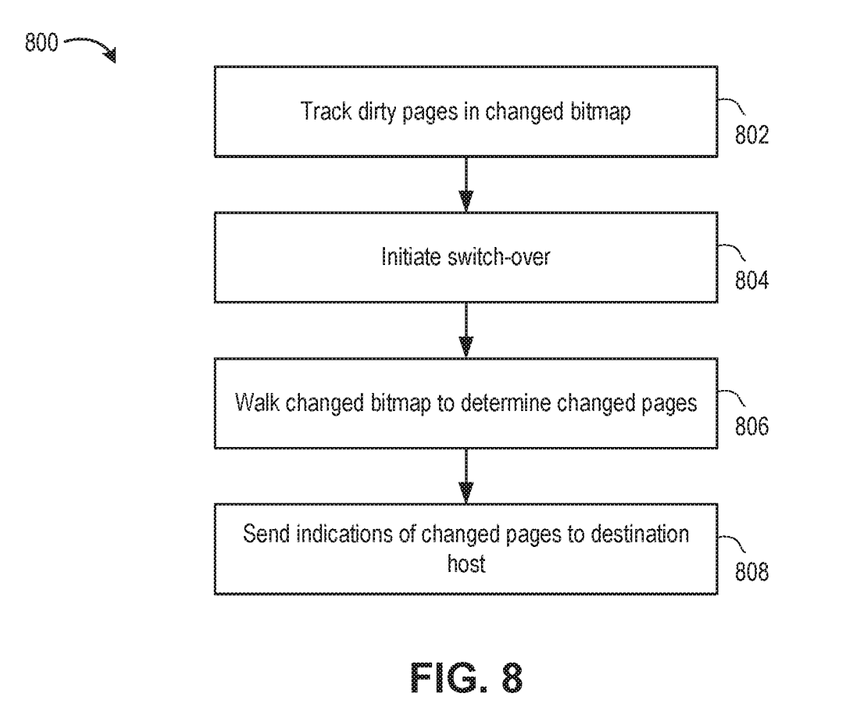
FIG. 8 is a flow diagram depicting a method of transmitting a changed bitmap from source to destination during switch-over of a VM migration process according to an embodiment.

FIG. 8 is a flow diagram depicting a method 800 of transmitting a changed bitmap from source to destination during switch-over of a VM migration process according to an embodiment. Method 800 begins at step 802, where VM migration module 138 in the source host tracks dirty pages in a changed bitmap. As discussed above, VM migration module 138 in the source will execute a pre-copy of the memory over several iterations prior to switch-over. At some point, VM migration module 138 initiates switch-over when some threshold amount of dirtied pages exist (step 804). At step 806, VM migration module 138 in the source walks the changed bitmap to determine the page numbers of the changed pages. At step 808, VM migration module 138 in the source transmits the page numbers of the changed pages to VM migration module 138 in the destination host. This avoids having to transmit the entire changed bitmap to the destination and then having the VM migration module 138 in the destination walk the changed bitmap. This improves the switch-over time in the VM migration process, particularly for VMs having a large amount of memory.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of migrating a virtual machine (VM) from a source host to a destination host in a virtualized computing system, the VM having a plurality of virtual central processing units (CPUs) supported by a CPU of the source host, the method comprising:
    copying, by a hypervisor executing in the source host, memory of the VM from the source host to the destination host over a plurality of iterations;
    installing, by the hypervisor, write traces spanning all the memory, the write traces configured to cause the CPU to notify the hypervisor, through page fault exceptions, that guest software in the VM modified the memory; and
    performing switch-over, by the hypervisor, to quiesce the VM in the source host;
    wherein the hypervisor installs the write traces using less than all the plurality of virtual CPUs in parallel with at least one of the plurality of virtual CPUs executing the guest software in the VM.

2. The method of claim 1, wherein the hypervisors installs the write traces using only one of the plurality of virtual CPUs.

3. The method of claim 1, wherein each of the plurality of virtual CPUs is configured to support a plurality of page granularities, and wherein the hypervisor installs the write traces on large pages of the memory having granularity larger than a smallest granularity of the plurality of page granularities.

4. The method of claim 1, wherein the step of installing the write traces comprises requesting each of the plurality of virtual CPUs to lazily flush an associated translation lookaside buffer (TLB).

5. The method of claim 1, further comprising re-installing, by the hypervisor during each of the plurality of iterations, at least one write trace.

6. The method of claim 5, wherein the hypervisor re-installs the at least one write trace using only one of the plurality of virtual CPUs.

7. The method of claim 1, further comprising:
    tracking, by the hypervisor, dirty pages in a tracking bitmap;
    walking the tracking bitmap at the source host, by the hypervisor during the switch-over, to identify page numbers of modified pages; and
    transmitting, by the hypervisor from the source host to the destination host, the page numbers.

8. The method of claim 1, further comprising:
    handling, at a hypervisor in the source host managing the VM, a trace fire in response to the guest software in the VM writing to a memory page of the memory;
    wherein each of the plurality of virtual CPUs is configured to support a plurality of page granularities, wherein the hypervisor installs the write traces at a first granularity of the plurality of granularities, and wherein the hypervisor handles the trace fire at a second granularity of the plurality of granularities different than the first granularity.

9. The method of claim 1, wherein each of the plurality of virtual CPUs is configured to support a plurality of page granularities, and wherein the method comprises:
    selecting a first granularity of the plurality of page granularities dynamically during run-time;
    wherein the write traces are installed at the first granularity.

10. A non-transitory computer readable medium having instructions stored thereon that when executed by a processor cause the processor to perform a method of migrating a virtual machine (VM) from a source host to a destination host in a virtualized computing system, the VM having a plurality of virtual central processing units (CPUs) supported by a CPU of the source host, the method comprising:
    copying memory of the VM from the source host to the destination host over a plurality of iterations;
    installing write traces spanning all the memory, the write traces configured to cause the CPU to notify a hypervisor of the source host, through page fault exceptions, that guest software in the VM modified the memory; and
    performing switch-over to quiesce the VM in the source host;
    wherein the step of installing the write traces is executed using less than all the plurality of virtual CPUs in parallel with at least one of the plurality of virtual CPUs executing the guest software in the VM.

11. The non-transitory computer readable medium of claim 10, wherein the step of installing the write traces is executed using only one of the plurality of virtual CPUs.

12. The non-transitory computer readable medium of claim 10, wherein each of the plurality of virtual CPUs is configured to support a plurality of page granularities, and wherein the write traces are installed on large pages of the memory having granularity larger than a smallest granularity of the plurality of page granularities.

13. The non-transitory computer readable medium of claim 10, further comprising:

handling a trace fire in response to the guest software in the VM writing to a memory page of the memory;

wherein each of the plurality of virtual CPUs is configured to support a plurality of page granularities, wherein the write traces are installed at a first granularity of the plurality of granularities, and wherein the trace fire is handled at a second granularity of the plurality of granularities different than the first granularity.

14. A virtualized computing system, comprising:

a source host executing a first virtual machine (VM) migration module, the source host executing a hypervisor and a VM, the source host including a central processing unit (CPU) that supports a plurality of virtual CPUs for the VM;

a destination host executing a second VM migration module;

wherein the first VM migration module is configured to cooperate with the second VM migration module to:

copy memory of a VM executing in the source host from the source host to the destination host over a plurality of iterations;

install, at the source host, write traces spanning all the memory using less than all of the plurality of virtual CPUs in parallel with at least one of the plurality of virtual CPUs executing guest software in the VM, the write traces configured to cause the CPU to notify the hypervisor, through page fault exceptions, that the guest software in the VM modified the memory; and perform switch-over to quiesce the VM in the source host and resume the VM in the destination host.

15. The virtualized computing system of claim 14, wherein the first VM migration module is configured to install the write traces using only one of the plurality of virtual CPUs.

16. The virtualized computing system of claim 14, wherein each of the plurality of virtual CPUs is configured to support a plurality of page granularities, and wherein the first VM migration module is configured to install the write traces on large pages of the memory having granularity larger than a smallest granularity of the plurality of page granularities.

17. The virtualized computing system of claim 14, wherein the first VM migration module is configured to request each of the plurality of virtual CPUs to lazily flush an associated translation lookaside buffer (TLB) subsequent to installing the write traces.

18. The virtualized computing system of claim 14, wherein the hypervisor in the source host is configured to handle a trace fire in response to the guest software in the VM writing to a memory page of the memory;

wherein each of the plurality of virtual CPUs is configured to support a plurality of page granularities, wherein the VM migration module is configured to install the write traces at a first granularity of the plurality of granularities, and wherein the hypervisor is configured to handle the trace fire at a second granularity of the plurality of granularities different than the first granularity.

19. A host, comprising:

a hardware platform comprising a central processing unit (CPU); and a hypervisor, executing on the hardware platform, managing a virtual machine (VM), the VM having a plurality of virtual CPUs supported by the CPU;

the hypervisor configured to:

copy memory of the VM from the host to a destination host over a plurality of iterations;

install write traces spanning all the memory, the write traces configured to cause the CPU to notify the hypervisor, through page fault exceptions, that guest software in the VM modified the memory, the write traces being installed using less than all the plurality of virtual CPUs in parallel with at least one of the plurality of virtual CPUs executing the guest software in the VM; and perform switch-over, by the hypervisor, to quiesce the VM in the source host.

20. The host of claim 19, wherein the hypervisor installs the write traces using only one of the plurality of virtual CPUs.

* * * * *